3,043,872
DECOLORIZATION METHOD FOR PIMELIC ACID
Richard L. Roberts, Milton, and John W. Lynn, Charleston, W. Va., assignors to Union Carbide Corporation, a corporation of New York
No Drawing. Filed Nov. 7, 1958, Ser. No. 772,403
3 Claims. (Cl. 260—537)

This invention relates in general to a new and useful method for decolorizing organic acids and more particularly to a method for decolorizing pimelic acid.

The esterification of dibasic organic acids with glycols gives polyesters which find extensive commercial use as plasticizers. In most cases, the plasticizers are incorporated into plastics and resins where it is essential that they satisfy low color requirements. Thus, for the final product to exhibit no undesirable color it is imperative that the polyester and each of the other constituents likewise exhibit no color characteristics. In most instances, the simple diesters may be purified by distillation to obtain an essentially color-free product whereas the high molecular weight polyesters are usually obtained as residue products and therefore cannot be purified by distillation. Thus in order to satisfy the low color requirements the organic acid used to prepare the high molecular weight polyester must itself satisfy low color requirements.

Pimelic acid has been esterified with alcohols, such as hexanols, octanols, and the like to form esters which may find extensive use as plasticizers and lubricants. Similarly, pimelic acid has been esterfied with glycols to give polyesters, which are also useful as plasticizers. Pimelic acid is produced by the caustic cleavage of sodium 3-cyclohexene-1-carboxylate as illustrated by the following equation:

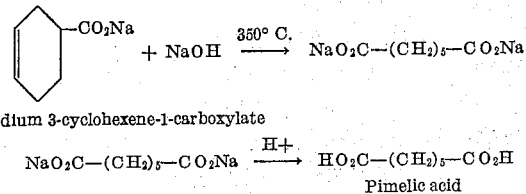

Sodium 3-cyclohexene-1-carboxylate $NaO_2C-(CH_2)_5-CO_2Na \xrightarrow{H+} HO_2C-(CH_2)_5-CO_2H$
Pimelic acid Crystallization of pimelic acid prepared by this process does not give a product of acceptable color. Although a product of excellent color is obtained by distillation of the acid, the losses encountered and the problems involved in distilling such a high-melting compound make this technique impracticable from a commercial standpoint. Decolorization by other known methods also proved ineffective. Thus the residue plasticizers prepared from pimelic acid by this process presented a serious color problem.

It is therefore an object of the present invention to provide a process for decolorizing pimelic acid whereby the above disadvantages are eliminated. Another object of the present invention is to provide a process for decolorizing pimelic acid whereby the resulting plasticizers into which the pimelic acid is incorporated exhibit a color reading on the Gardner color scale of less than 4. A further object of the present invention is to provide a decolorizing process which is effective for non-distillable high-melting compounds. Other objects and a fuller understanding of the present invention will be apparent from the following detailed description.

Briefly stated, the present invention is directed to a process for decolorizing pimelic acid in order to satisfy the low-color requirements needed by organic acids employed in polyester synthesis, which comprises treating an aqueous solution of crude pimelic acid with ozone and recovering the decolorized pimelic acid from the solution by crystallization.

In accordance with the practice of the present invention, the crude pimelic acid obtained from alkali cleavage of sodium 3-cyclohexene-1-carboxylate was dissolved in distilled water to give approximately a 30 percent solution and held at from about 25° C. to about 75° C. and preferably 50° C. for from about 0.5 to about 6 hours while an ozone-containing gas was sparged into the solution at a rate and concentration sufficient to decolorize the pimelic acid. In a preferred embodiment the ozone was added to the pimelic acid solution as a 5 percent mixture in oxygen at a rate of from about 0.01 to about 0.03 cubic foot of mixed gas per minute per liter of solution and preferably 0.02 cubic foot per minute per liter of solution for a period of three hours. The solution of decolorized pimelic acid was cooled to a temperature sufficient to cause the acid to crystallize, preferably about 5° C. The precipitated pimelic acid was then removed by filtration and dried.

The melt color of pimelic acid obtained by direct recrystallization of the crude acid from water was compared with that of the same crude acid treated with ozone prior to crystallization. Also the color of esters prepared from crystallized pimelic acid and ozone-treated crystallized pimelic acid were compared. In each case, the comparative data of the ozone-treated and untreated pimelic acid indicates the surprising and unexpected results obtained by the use of ozone as a decolorizing agent for pimelic acid.

Colors of pimelic acid and its esters were compared visually with a series of officially accepted varnish standards through the use of an apparatus (Hellige Pocket Comparator #605) manufactured by Hellige, Inc., Garden City, N.Y., for the express purpose of comparing the colors of varnishes and similar transparent, colored liquids.

This apparatus consists of a housing into which can be inserted, (1) the sample to be tested and (2) a color disk upon which are mounted a series of circular glass color standards which reproduce exactly the colors of the 1933 Gardner liquid standards and thus conform to the official color system of the paint and varnish industry. In the case of solids such as pimelic acid, the material is heated to above its melting point in the test tube, and the color value read while the material is in the molten state. The esters of pimelic acid, being transparent liquids, were read directly.

The following examples illustrate the best mode presently contemplated for the decolorization of pimelic acid by treatment with ozone:

EXAMPLE I (a) Synthesis of Crude Pimelic Acid

A mixture of 214 grams of 3-cyclohexene-1-carbonitrile, 200 grams of sodium hydroxide and 450 grams of water was charged to a nickel-lined bomb in a rocking furnace. The system was purged with nitrogen and then heated to 320° C. at 2000 pounds per square inch gauge autogenous pressure for 6 hours. The charge was cooled, removed and diluted to 930 grams with water. The solution was thereafter acidified to pH 1 with sulfuric acid and the pimelic acid removed by extraction with three 300 gram portions of isophorone. Distillation of the extract gave pimelic acid in 88 percent yield and with the following physical characteristics: melting point 103°–105° C., 96.2% purity by titration with sodium hydroxide, color 10.5, Gardner, 1933.

(b) Recrystallization From Water

A 31 gram sample of the above-synthesized pimelic acid was heated to solution with 100 grams of distilled water and then chilled to 5° C. to crystallize. The precipitated pimelic acid was removed by filtration and dried.

(c) Treatment With Ozone

A 30 gram sample of the above-described pimelic acid was dissolved in 100 grams of distilled water and held at 50° C. for three hours while ozone as a 5 percent mixture in oxygen, was sparged through the solution at a rate of 0.02 cubic foot of gas mixture per minute per liter of solution. The solution was cooled to 5° C. to crystallize the pimelic acid. The precipitated acid was removed by filtration and dried.

The following data vividly demonstrates the marked improvement in color characteristics of pimelic acid treated in accordance with the method of the invention.

|  | Gardner Color | M.P., °C. | Percent Purity |
|---|---|---|---|
| Ozone-treated Pimelic acid (c) | 3.5 | 103-104 | 98.9 |
| Recrystallized Pimelic acid (b) | 10.5 | 102-104 | 95.8 |

EXAMPLE II

(a) Polyester Prepared From Ozone-Treated Pimelic Acid

A mixture of 240 grams of the ozone-treated pimelic acid, 241 grams of 2-ethyl-1,3-hexanediol and 300 milliliters of toluene was heated at reflux for a period of 16 hours while water was removed azeotropically. The reaction mixture was stripped to 175° C. at a pressure of 3 millimeters of mercury to give 421 grams of residual polyester.

(b) Polyester Prepared From Recrystallized Pimelic Acid

A mixture of 240 grams of the pimelic acid which was recrystallized from water without the ozone-treatment, 241 grams of 2-ethyl-1,3-hexanediol, and 300 milliliters of toluene were refluxed for a period of 16 hours while water was removed azeotropically. The reaction mixture was stripped to 173° C. at a pressure of 3 millimeters of mercury to give 417 grams of residual polyester.

The following data vividly demonstrates the marked improvement in color characteristics of pimelic acid treated in accordance with the method of this invention.

| Polyester Prepared From— | Gardner Color | Acidity, Cubic Centimeters of 1 N NaOH per gram |
|---|---|---|
| Ozone-treated pimelic acid | 3 | 0.0888 |
| Recrystallized pimelic acid | 10 | 0.1275 |

The unexpected improvements achieved are readily evident from the data presented. It appears that the improved color characteristics are directly related to the color of the esters prepared therefrom.

The foregoing detailed description has been given for clearness of understanding of the present invention and no unnecessary limitations are to be understood therefrom except as such limitations appear in the claims.

What is claimed is:

1. A process for the decolorization of crude pimelic acid produced by the caustic cleavage of sodium 3-cyclohexene-1-carboxylate which comprises treating an aqueous solution of said pimelic acid with an ozone-containing gas, wherein ozone is present in said gas in a concentration of up to 5 percent, at a rate and for a period of time sufficient to decolorize said pimelic acid and recovering decolorized pimelic acid from said aqueous solution by crystallization.

2. A process for the decolorization of crude pimelic acid produced by the caustic cleavage of sodium 3-cyclohexene-1-carboxylate which comprises treating an aqueous solution of said pimelic acid with an ozone-containing gas, wherein ozone is present in said gas in a concentration of up to 5 percent, at a rate of from about 0.01 to about 0.03 cubic foot of gas per minute per liter of solution for a period of from 0.5 to 6 hours and recovering decolorized pimelic acid from said aqueous solution by crystallization.

3. A process for the decolorization of crude pimelic acid produced by the caustic cleavage of sodium 3-cyclohexene-1-carboxylate which comprises treating a 30 percent by weight aqueous solution of said pimelic acid with a mixture of up to 5 percent ozone in oxygen at a rate of 0.02 cubic foot of gas mixture per minute per liter of solution for a period of 3 hours and recovering decolorized pimelic acid from said aqueous solution by crystallization.

References Cited in the file of this patent

UNITED STATES PATENTS 2,879,288   Grosskinsky et al. _____ Mar. 24, 1959

FOREIGN PATENTS 857,361   Germany _____ Nov. 27, 1952

OTHER REFERENCES

Groggins: "Unit Processes in Organic Synthesis," 4th Edition, 1952, pp. 420 and 429.

Niegowski: Ind. Eng. Chem. 45, 632–634 (1953).